United States Patent [19]

Conners et al.

[11] 4,101,112
[45] Jul. 18, 1978

[54] PIPE LINE COUPLING SYSTEM

[76] Inventors: John A. Conners, 510 Main St., Bridgeport, Conn. 06604; Hyman Posner, 61-16th St., Roxboro, Canada

[21] Appl. No.: 872,146

[22] Filed: Jan. 25, 1978

Related U.S. Application Data

[62] Division of Ser. No. 744,704, Nov. 24, 1976, abandoned.

[51] Int. Cl.$^2$ ............................................... F16K 1/22
[52] U.S. Cl. ....................................... 251/148; 251/305
[58] Field of Search ............... 251/148, 151, 152, 305, 251/306, 307, 308; 285/363, 368, 405, 412

[56] References Cited

U.S. PATENT DOCUMENTS

| | | | |
|---|---|---|---|
| 943,461 | 12/1909 | Reynolds | 285/412 |
| 1,462,698 | 7/1923 | Haughey | 285/412 |
| 2,749,149 | 6/1956 | Carpenter | 285/363 X |
| 3,401,913 | 9/1968 | Scaramucci | 251/151 |
| 3,515,416 | 6/1970 | Pickert | 285/368 X |
| 3,752,181 | 8/1973 | Morris | 251/307 X |

FOREIGN PATENT DOCUMENTS

| | | | |
|---|---|---|---|
| 561,573 | 10/1957 | Belgium | 285/412 |
| 781,144 | 8/1957 | France | 285/368 |

*Primary Examiner*—William R. Cline

[57] ABSTRACT

A clamp for securing in a fluid proof manner a wafer type butterfly valve to the coupling flange of a pipe. Wafer type butterfly valves are inserted between the flanges of two aligned pipes and are retained in position by bolts connecting the two flanges and engaging around the apertureless wafer flange of the valve body. The clamp of the invention is designed to secure such a wafer type butterfly valve to a pipe flange of the end of a pipe line to form a dead end pipe line. The clamp is made of two separate clamp members which are mirror images of each other. Each clamp comprises a flat arcuate flange section adapted to overlap a flange portion of the valve body. Said flange section has bolt receiving holes adapted to the aligned with half the number of bolt receiving apertures of the pipe coupling flange. Each clamp member further includes a collar section rigid with the flange section and perpendicular thereto. The collar section has portions adapted to come in close relation with the outer edge of the wafer flange of the valve body and is provided with a series of equally spaced indents for clearing the bolt receiving holes of the flange section. The collar sections serve to easily center the clamp with respect to the valve body and pipe flange and to further maintain said valve body against rotation. Preferably the bolt receiving holes in the flange section of each clamp member are threaded to eliminate the use of nuts.

2 Claims, 3 Drawing Figures

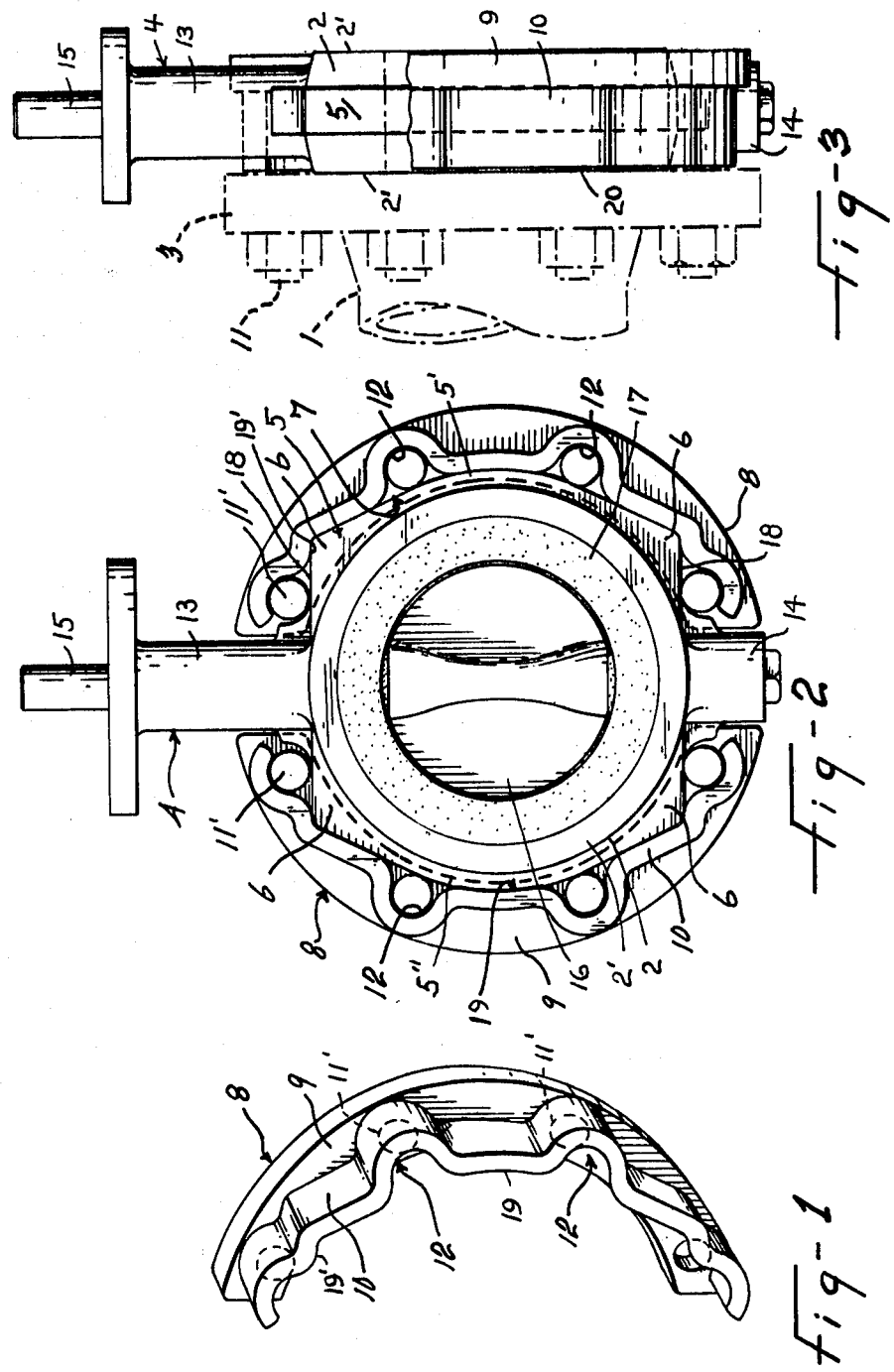

PIPE LINE COUPLING SYSTEM

This application is a division of application Ser. No. 744,704, filed Nov. 24, 1976 and now abandoned.

The invention relates to a clamp for securing in a fluid proof manner a wafer type butterfly valve to the coupling flange at the end of a pipe to form a dead end pipe line. Up to now, more expensive lug type butterfly valves had to be used for such a purpose. Lug type valves have threaded lugs allowing the same to be bolted directly to a coupling flange at the end of a pipe. Such lug type butterfly valves are more expensive than wafer type butterfly valves. The latter are normally used between the two coupling flanges of aligned pipes.

It is the general object of the present invention to provide a clamp to enable securing a wafer type butterfly valve to the coupling flange at the end of a pipe to provide a dead end pipe line.

It is an other object of the invention to provide a clamp of the character described which allows the dead end pipe line to be extended.

It is an other object of the invention to provide a clamp of the character described which can be removed from between two coupling flanges to be reused at another location.

The foregoing will be better understood by reference to the following disclosure of a preferred embodiment which is illustrated in the accompanying drawings in which;

FIG. 1 is a perspective view one of the two clamps members forming the clamp of the invention;

FIG. 2 is an end view of a wafer type butterfly valve fitted with the two clamping members of the invention;

FIG. 3 is a lateral view of the same butterfly valve and clamp and secured to the coupling flange of a pipe shown in dot-and-dash lines. In the drawing, like reference numerals indicate like elements throughout. FIG. 3 shows a standard pipe 1 having at one end a coupling flange 3 outwardly projecting from pipe 1. Coupling flange 3 is provided with the conventional bolt receiving apertures equally spaced apart around the pipe 1 and adapted to receive bolts 11.

The clamp of the invention is to secure in a fluid-tight manner a wafer type butterfly valve generally indicated at 4 to the flange 3 of the pipe 1 by means of the bolts 11.

Butterfly valve 4 is of conventional construction and includes a generally circular valve body 2 having parallel flat end faces 2′. A bonnet 13 projects radially outwardly from the valve body 2 and diametrically opposite boss 14 is aligned with bonnet 13 on a common axis. The bonnet 13 and boss 14 serve as journals for the spindle 15 of the valve disc 16. The flexible liner 17 of the valve protudes slightly from the end faces 2′. The valve body has an apertureless wafer flange 5 projecting from the middle plane of the valve body 2 and has opposite flat faces parallel to and recessed from the respective flat end faces 2′ of the valve body 2. The wafer flange 5 forms two diametrically opposite flange portions 5′ and 5″ each having two straight end edges 18 and an intermediate arcuate edge 7 meeting the end edges 18 at an angle to form angular corners 6. The straight end edges 18 of a one flange portion 5′ are aligned with the corresponding straight end edges 18 of the other flange portion 5″. The straight end edges are substantially perpendicular to the common axis of the bonnet 13 and boss 14. Both flange portions 5′, 5″ are arranged to clear the bolt receiving apertures of the pipe coupling flange 3.

The clamp of the present invention includes a pair of clamp members 8 which are mirror images of each other and which are engageable with the respective flange portions 5′ or 5″ of the valve body on both sides of the bonnet 13 and boss 14.

Each clamp member 8 includes a flange section 9 and a collar section 10 rigid with the flange section 9 substantially perpendicular thereto.

Flange section 9 is flat and has an arcuate shape; it is adapted to overlap the flange portions 5′ or 5″ of the valve body 2 and to extend around the said valve body 2. Flange section 9 is flat and has a thickness which is smaller than the axial distance between the flat end faces 2′ of the valve body 2 and corresponding recessed flat face of the flange portion 5′ or 5″. Each flange section 9 has a series of equally spaced bolt receiving holes 11′ adapted to register with the bolt receiving apertures of the coupling flange 3 of the pipe 1.

The collar section 10 of each clamp member 8 defines an inner arcuate surface 19 which is complementary to and is adapted to closely surround the arcuate edges 7 of the flange portions 5′, 5″. Each collar sections forms at its two ends an extension providing a straight inner surface 19′ making an angle with the arcuate surface 19 and adapted to closely extend along the corresponding straight end edges 18 of the flange portions 5′, 5″.

The collar sections 10 are arranged to clear the bolt receiving holes 11′. For this purpose, the collar sections, if continuous, are outwardly curved to form at their inner surface a series of equally spaced indents 12 for clearing the holes 11′.

Holes 11′ are preferably threaded. A butterfly valve 4 is clamped to one end of a pipe 1 by axially abutting the flange sections 9 of the clamp members 8 against the wafer flange 5 of the valve body in overlapping arrangement therewith and by inserting bolts 11 through the bolt receiving apertures of the coupling flange 3, through indents 12 and by screwing the bolts 11 within bolt receiving holes 11′ of the flange sections 9. The collar sections 10 overly the bolts 11. The clamp compresses the liner 17 in a fluid tight manner against the coupling flange 3.

In the attached position of the valve, the free edge 20 of the collar section naturally does not touch the outer face of the coupling flange 3. Preferably the bolt receiving holes 11′ of the clamp 8 are threaded to directly receive the threaded ends of the bolts 11, however they can have a smooth bore to receive bolts fitted with nuts at their outer end.

The clamp can be used as a permanent coupling arrangement of the valve to the end of a pipe or as a temporary arrangement pending extension of the piping system at a later date and this without relieving pressure in the pipe line up to the valve. In this latter case longer bolts are used so as to eventually engage two pipe flanges with the butterfly valve in between. When the line is required to be extended a new pipe flange is fitted to the longer bolts and nuts are installed on the bolts at the back face of the new pipe flange.

The clamp members 8 can also be removed from one location to be reused at another location in the piping system; for this purpose, the pipe line should be relieved of pressure. One of the two clamp members 8 is removed by taking off the bolts out of the threaded holes in that clamp members. An extension pipe is then bolted with the valve between the two coupling flanges, then the other clamping member is removed and the bolts are used to connect the other half of the coupling flanges of the two pipes. The clamp members 8 are then available for use at another location.

What we claim is:

1. A clamp for securing in fluid-proof manner a wafer type butterfly valve to the radially outwardly extending annular coupling flange at the end of a pipe, said coupling flange having a series of equally spaced bolt receiving apertures arranged in a circle around the pipe, said wafer type butterfly valve being of the type including a generally circular flat valve body having opposite flat end faces, a radially projecting bonnet and a diametrically opposite boss aligned along a common axis, said valve body further including an apertureless wafer flange projecting from the middle plane of said body and having opposite flat faces parallel to and recessed from the respective flat end faces of said valve body, said wafer flange forming two diametrically opposite flange portions each having two straight end edges and an intermediate arcuate edge, said straight end edges making an angle with said arcuate edge, each of the two straight end edges of one flange portion being aligned with a corresponding straight end edge of the other flange portion and extending along a line substantially perpendicular to said common axis, said two flange portions adapted to clear said bolt receiving apertures, said clamp including two separate clamp members each engageable with a flange portion of said valve body on one side of said bonnet and said boss, each clamp member being a mirror image of the other and including a flange section and a collar section rigid with said flange section and substantially perpendicular thereto, said flange section being flat and of arcuate shape and adapted to overlap a flange portion of said valve body and to extend around said valve body, said flange section having a thickness smaller than the axial distance between a flat end face of said valve body and the corresponding recessed flat face of said valve body flange portion, each flange section having a series of equally spaced bolt receiving holes adapted to register with half the number of bolt receiving apertures of said coupling flange, said collar section forming an inner arcuate surface complementary with and adapted to closely surround said arcuate edge of said flange portion and, at both ends of said inner arcuate surface and making an angle therewith, a straight surface adapted to closely extend along the corresponding straight end edges of said flange portions, said collar section clearing the bolt receiving holes of said flange section.

2. A clamp as claimed in claim 1, wherein said collar section is continuous and forms at its inner surface a series of equally spaced indents clearing said bolt receiving holes of said flange section.

* * * * *